March 5, 1963
F. C. EGLEY
3,079,743
MOTORIZED LAWN EDGER
Filed Jan. 23, 1961
2 Sheets-Sheet 1
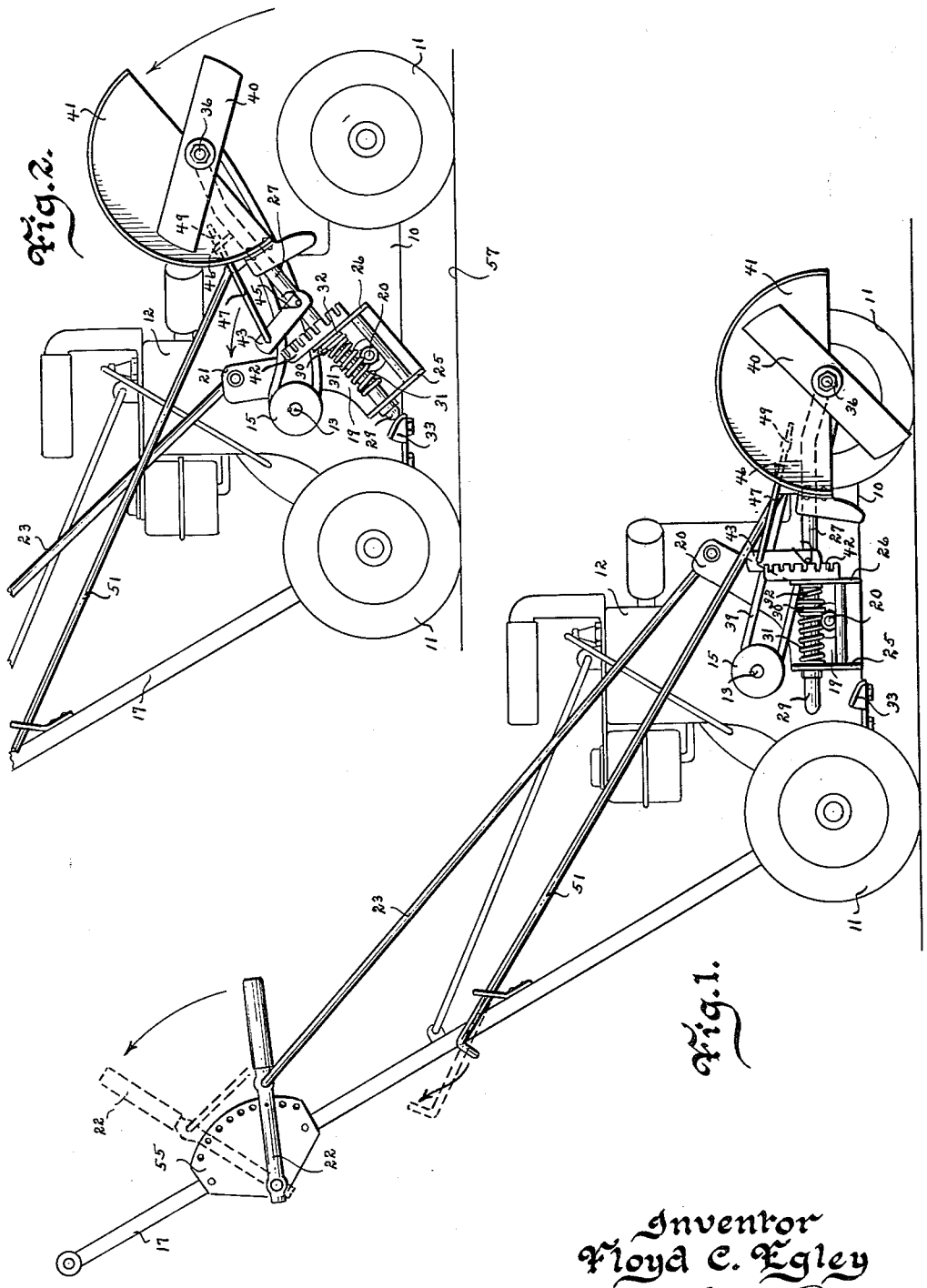
Inventor
Floyd C. Egley
by Talbert Dick & Jarley
Attorneys
Witness
Edward P. Seeley March 5, 1963　　　　F. C. EGLEY　　　　3,079,743
MOTORIZED LAWN EDGER
Filed Jan. 23, 1961　　　　　　　　　　　　　　2 Sheets-Sheet 2
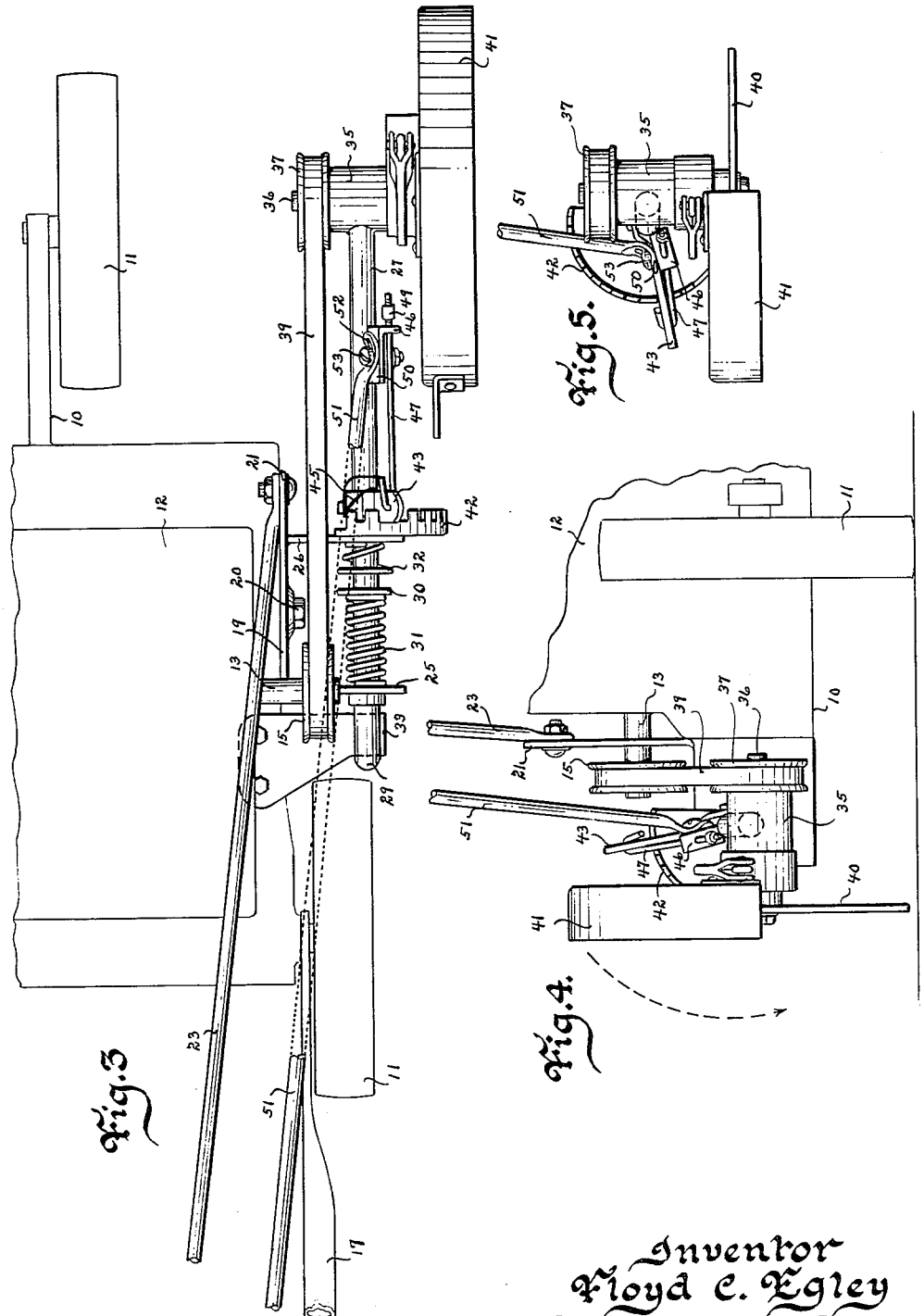
Witness
Edward P. Seeley
Inventor
Floyd C. Egley
by Talbert Dick & Jarley
Attorneys 3,079,743
MOTORIZED LAWN EDGER
Floyd C. Egley, Des Moines, Iowa, assignor to Western Tool and Stamping Company, Des Moines, Iowa, a corporation of Iowa
Filed Jan. 23, 1961, Ser. No. 84,210
4 Claims. (Cl. 56—25.4)

This invention relates to turf or grass edgers normally used to cut the turf or grass adjacent curbs, sidewalks or like.

The use of edgers is old. Most edgers consist of a wheel supported frame, a prime mover on the frame, and a rotatable cutting blade operatively connected to the prime mover. Usually the wheels of the device roll on the adjacent sidewalk or like. The difficulty experienced heretofore with such devices is that the sidewalk or its curb does not always lie in the proper horizontal plane for supporting the wheels of the edger. This is especially true if the roadway, curb, walk or like adjacent to the lawn has more than one horizontal plane surface, or if it slopes in a lateral direction from the turf or grass to be cut.

Some motorized lawn edgers not only permit the vertical adjustment of the cutting blade, but also permit the blade unit to be selectively placed in either a vertical or horizontal position. However, the objection to such a device is that the rotating blade is a very dangerous instrument and it is not possible from a position at the guiding handle bar to manually disengage the blade from the prime mover, nor to change the blade unit from a vertical position to a horizontal position or vice versa.

Therefore one of the principal objects of my invention is to provide a motorized turf edger that may easily be controlled from the guiding handle bar so as to operatively disconnect the engine from the turf cutting blade.

A further object of this invention is to provide a motorized turf cutting device that can not have its rotating cutting blade changed from a vertical position to a horizontal position, or vice versa, without first disconnecting the prime mover from the blade.

A still further object of this invention is to provide a motorized lawn edger that is under the complete control of the operator at a position to the rear of the guiding handle means.

Still further objects of my invention are to provide a safe motorized turf edger that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side view of my turf edger in position for operation.

FIG. 2 is a side view of the turf edger with the cutting blade unit elevated to a non-functioning position.

FIG. 3 is an enlarged top plan view of the operating mechanism of the device.

FIG. 4 is an enlarged front end view of my turf edge, and

FIG. 5 is an enlarged front end view of the blade position holding means showing the blade being held in a horizontal position.

In these drawings I have used the numeral 10 to generally designate the chassis of the edger supported by wheels 11. Mounted on this chassis is an internal combustion engine 12 having the drive shaft 13 as shown in FIG. 2. The numeral 15 designates a pulley wheel on the shaft 13. The numeral 17 designates the guiding handle bar means extending upwardly and rearwardly from the rear end of the chassis 10. The numeral 19 designates a vertical bracket member rotatably mounted to the chassis 10 by a bolt stud 20. Extending upwardly from the top of the bracket member is an arm portion 21. Adjustably hinged to the upper end portion of the guide handle means 17 is a lever 22. The numeral 23 designates a control rod having one end pivoted to the lever 22 and its other end pivoted to the arm 21, as shown in FIG. 1. Extending outwardly from the bracket 19 are two spaced apart bearing ears 25 and 26. Rotatably and slidably extending through these two bearing ears is an elongated supporting shaft 27, having its rear end 29, rounded as shown in FIG. 1. Fixed on the shaft 27 between the two bearing ears is a plate 30. The numeral 31 designates a coil spring embracing the shaft 27, having one end engaging the ear 25 and its other end engaging the plate 30. The numeral 32 designates a coil spring embracing the shaft 27, having one end engaging the ear 26 and its other end engaging the plate 30. These two springs 31 and 32, yieldingly hold the shaft 27 in its sliding position shown in FIG. 1. Normally below the end 29 of the shaft 27, and secured to the chassis 10 is a cam plate 33 capable of being contacted by the end 29 of the shaft 27, when the lever 22 is manually swung upwardly and rearwardly. On the forward free end of the shaft 27 is a transverse bearing 35. Rotatably mounted in the bearing 35 is a shaft 36. The numeral 37 designates a pulley wheel on the shaft 36. The numeral 39 designates an endless belt embracing the two pulley wheels 15 and 37. The numeral 40 designates a turf cutting blade secured at its center to the outer end of the shaft 36. Adjustably secured to the bearing 35 and embracing approximately one half of the circular cut by the rotating blade 40 is an ordinary one-half circular hood shield 41. The numeral 42 designates a toothed arcular plate on the forward side of the ear 26. Hinged at one end to the shaft 27 is a bar 43 capable of selectively engaging the space between any two teeth of the toothed plate 42, as shown in FIG. 5. A spring means 45 yieldingly holds the bar in a direction toward the plate 42. The numeral 46 designates an ear on the shaft 27. The numeral 47 designates a rod having one end hinged to the outer end of the bar 43 and its other end slidably extending through the ear 46. The numeral 49 designates a nut adjustably threaded onto the forward end portion of the rod 47 and beyond the ear 46. The ear 46 has a rearwardly extending plate 50. The numeral 51 designates a control rod having its rear end rotatably attached to the handle bar 17 and its forward end portion adjacent the plate 50. In the forward end portion of the rod 51 is an elongated slot 52. The numeral 53 designates a bolt stud loosely extending through the plate 51 and the slot 52, as shown in FIG. 3. The practical operation of the device is as follows:

It will be noted that both the control rods 23 and 51 extend upwardly and to the rear and are operatively attached to the guide handle bar 17. By moving the lever 22 forwardly and downwardly the supporting shaft 27 will have its forward free end accordingly lowered thereby bringing the cutting blade 40 into engagement with the turf as shown in FIG. 1. The position adjustment of the lever 22 on the plate 55 will determine the downward position of the cutting blade relative to the chassis. This fixed adjustment may be necessary because of the different distances the walk or surface 57 is above the turf to be cut. With the shaft 27 in such lowered position on the endless belt 39 will be taut and the prime mover will be rotating the cutting blade. When it is desired to disengage the engine from the cutting blade it is merely necessary to move the lever 22 upwardly and rearwardly thereby raising the forward end of the shaft 27 and thus loosening the belt 39 as shown in FIG. 2. As hereebefore indicated it may be desired to have the cutting blade operating in a horizontal position rather than in a vertical position. In fact it may be desirable to have the cutting blade operate at different angles to the vertical. Obviously the manual rotation of the control rod 51 will rotate the shaft thereby changing the position of the cutting blade. This, however, cannot be accomplished unless the cutting blade is in an elevated position as shown in FIG. 2 and disconnected from the engine. The reason for this is that when the cutting blade is at a lowered position as shown in FIG. 1, the bar 43 will be engaging the toothed plate 42 and preventing any rotation of the shaft 27. However, when the cutting blade is elevated as shown in FIG. 2, the rear end 29 of the shaft 27 will engage the cam plate 33 thereby automatically sliding the shaft 27 forwardly. With the shaft 27 in such forward sliding position the bar 43 will be out of contact with the toothed plate 42 and at which time the control rod 51 may be rotated for rotating the supporting shaft 27 in either direction. It will therefore be appreciated that the changing of the position of the cutting blade cannot be accomplished unless it is first operatably disconnected from the prime mover and furthermore the connecting and disconnecting of the blade from the engine and the changing of its position of operation cannot be accomplished except from the safety zone at the guiding handle bar area. After the cutting blade has been placed in the desired vertical or horizontal position it is merely necessary to move the lever 22 forwardly and downwardly thereby effectively tightening the belt 39 and operatably connecting the engine with the shaft of the cutting blade.

Some changes may be made in the construction and arrangements of my motorized lawn edger without departing from the real spirit and purpose of my invention, and it is my intention to cover by my claims, any modified forms of structure or use of mechanical equivalents which may be reasonably included within their scope.

I claim:

1. A lawn trimming and edging apparatus comprising in combination;

a wheeled frame;

a bracket pivotally mounted on one side of said frame for movement in a vertical plane extended longitudinally of said frame;

an elongated shaft mounted on said bracket and extended substantially longitudinally of said frame, said shaft being longitudinally reciprocal and axially rotatable relative to said bracket;

spring means engaging said bracket and said shaft and adapted to bias said shaft toward one position relative to said bracket, said shaft reciprocally movable to a second position;

cutter blade means rotatably mounted on the forward end of said shaft;

power means mounted on said frame;

driving means interconnected between said power means and said cutter blade means, said driving means operative when said shaft is in said one position, and inoperative when said shaft is in said second position relative to said bracket;

a curved rack secured to said bracket;

a detent mounted on said shaft and engaged with said rack when said shaft is in said one position, said detent operable to restrain said shaft against rotative movement, said detent disengaged from said rack in response to movement of said rack to said second position;

control means including a first hand lever operable to pivot said bracket, and including a second hand lever operable to rotate said shaft; and means mounted on said frame and engageable by the rear end of said shaft upon operation of said first hand lever, said shaft movable against the bias of said spring means in response to continued operation of said first hand lever to pivot said bracket and movable to said second position in response to said continued movement.

2. The combination set forth in claim 1 wherein said driving means comprises a continuous belt which is taut in said one position of said shaft, and which is loose and inoperative in said second position of said shaft.

3. The combination set forth in claim 1 including handle bar means connected to the rear end of said frame and extended upwardly and rearwardly therefrom, said first hand lever and said second hand lever both movably connected to said handle bar means.

4. The combination set forth in claim 1 wherein said frame mounted means engageable by the rear end of said shaft includes a stationary cam plate mounted on said frame in axial alignment with said shaft in spaced relation therefrom when said shaft is in said one position.

References Cited in the file of this patent
UNITED STATES PATENTS

| | | |
|---|---|---|
| 2,691,264 | Miller | Oct. 12, 1954 |
| 2,739,437 | True | Mar. 27, 1956 |
| 2,855,742 | Cooper et al. | Oct. 14, 1958 |
| 2,902,097 | Cairns | Sept. 1, 1959 |
| 2,909,021 | McLane | Oct. 20, 1959 |